Aug. 27, 1935.  F. G. LOGAN  2,012,588
ELECTRIC REGULATING APPARATUS
Filed Aug. 19, 1933  3 Sheets-Sheet 1

INVENTOR
Frank G. Logan
BY Lawrence K. Sager
his ATTORNEY

Aug. 27, 1935.　　　F. G. LOGAN　　　2,012,588

ELECTRIC REGULATING APPARATUS

Filed Aug. 19, 1933　　　3 Sheets-Sheet 2

INVENTOR
Frank G. Logan
BY
Laurence K. Sager
his ATTORNEY

Aug. 27, 1935.    F. G. LOGAN    2,012,588
ELECTRIC REGULATING APPARATUS
Filed Aug. 19, 1933    3 Sheets-Sheet 3

INVENTOR
Frank G. Logan
BY
Lawrence K. Sager
his ATTORNEY

Patented Aug. 27, 1935

2,012,588

UNITED STATES PATENT OFFICE 2,012,588

ELECTRIC REGULATING APPARATUS

Frank G. Logan, Mount Vernon, N. Y., assignor to Ward Leonard Electric Company, a corporation of New York Application August 19, 1933, Serial No. 685,898

29 Claims. (Cl. 171—119)

This invention relates to the regulation of the voltage of dynamo-electric generators and is applicable to both alternating and direct current generators.

The regulators in general use have the serious disadvantage of necessitating a departure from normal of a considerable degree before acting to check the same. Thus the voltage cannot be maintained constant, or approximately constant, but deviates therefrom more and more according to the amount of compensation required. Furthermore, such regulators require delicate and finely adjusted moving parts necessitating more or less frequent attention and repairs or adjustments, usually cause an over-correction before arriving at a stable condition, are expensive and not always dependable.

The present invention is based upon an improved method of control wherein an infinitesimal deviation from normal could be counteracted by an infinite correction factor in theory; and even in practice the theoretical condition may be approached, depending upon the capacity and resistance of the controlling means, so that the deviation from normal voltage under extreme changes of load, can be made very slight. Thus one of the main objects of this invention is to provide an improved method of control and improved control apparatus which will maintain a substantially constant voltage under wide variations in load conditions. Another object is to avoid the use of delicate moving parts with their attendant disadvantages and to provide apparatus which will be dependable at all times and free from the necessity of frequent inspection, adjustment and repairs. Another object is to avoid the sluggish action of prior commercial regulators and to provide controlling apparatus which will act quickly to correct any tendency to depart from normal and also avoid over-correction to any material degree. Another object is to utilize apparatus readily available at low cost of manufacture. Another object is to permit convenient location of the regulator at any desired location. Another object is to attain efficiency in operation and avoid waste of energy in heat losses. Other objects and advantages will be understood from the following description and accompanying drawings.

The present invention is an improvement over my pending application, Serial No. 685,530 filed August 17, 1933. In the present case an even higher degree of refinement of control of the voltage is obtainable than in the disclosure of said pending application; also the present improvement is more desirable for generating apparatus of large capacity.

In carrying my invention into effect, I provide a reference voltage or other reference factor of approximately constant or fixed amount which may be derived from the source to be controlled or provided by any source that will maintain an approximately fixed reference factor. This reference voltage or reference factor is related in various ways to a condition corresponding to the voltage of the source to be controlled so that a slight change therein is caused to bring about a corrective action of almost any amount desired thus maintaining the generator voltage within very close limits.

Figure 1:
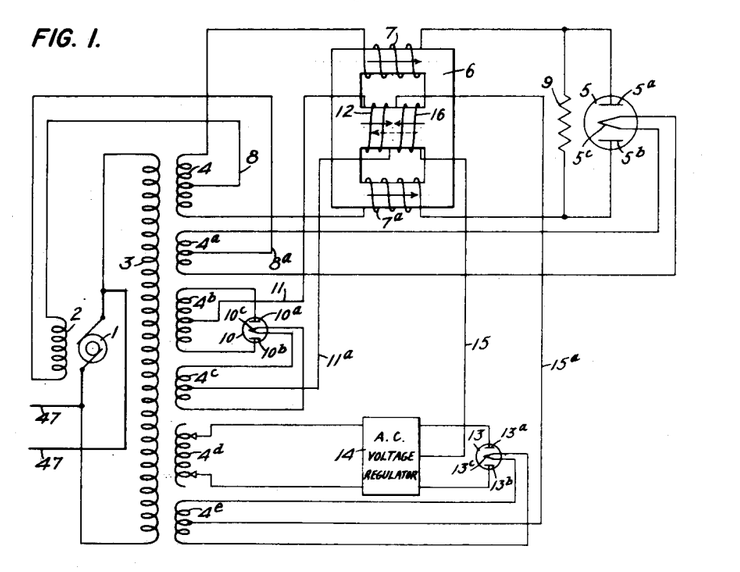
Fig. 1 is a diagram indicating one embodiment of this invention wherein the voltage of an alternating current generator is regulated.

Referring to Fig. 1, the alternator, whose voltage is to be kept at approximately constant normal value, is indicated as having the generating element 1 and a field element 2. The field element is excited by direct current and the value of the direct current of this field element is controlled in such a way as to maintain the generator voltage at the normal amount. The generator, instead of having its field element directly controlled, as shown, may be energized by an exciter which exciter will have its field element controlled, as is well understood in the art. For simplicity, the field of the generator is shown as being directly controlled in Fig. 1, as well as in the other figures.

The alternator is shown supplying a transformer having a primary winding 3 and a plurality of secondary windings 4, 4ª, 4ᵇ, 4ᶜ, 4ᵈ and 4ᵉ. The field winding 2 is variably controlled by the output of a rectifier 5 having the anodes 5ª and 5ᵇ and a cathode 5ᶜ, giving full wave rectification.

A controlling reactor is shown as having a laminated core 6 of the three-legged type with the ends connected by end cross-pieces. Around each of the outside legs of this core is a winding 7, 7ᵃ. The secondary winding 4 supplies current to the anodes or plates 5ᵃ, 5ᵇ of the rectifier, the upper terminal of the winding 4 being connected to the anode 5ᵃ through the series connected controlling winding 7 shown on the upper leg of the core 6. The lower terminal of the secondary winding 4 is shown connected to the anode or plate 5ᵇ of the rectifier through the series connected controlling winding 7ᵃ on the lower leg of the core 6. The control windings 7, 7ᵃ, in addition to functioning as the usual series anode reactors or chokes, also serve, by additional controlling means, to regulate the output of the rectifier 5 to the field winding 2. A mid-tap from the secondary winding 4 extends to form the negative output line 8 of the rectifier and is connected to one terminal of the field winding 2. The cathode or filament 5ᶜ of the main rectifier is supplied with heating current from the secondary winding 4ᵃ of the transformer, a mid-tap 8ᵃ therefrom extending to form the positive line of the rectifier output and is connected to the other terminal of the field winding 2.

From a point between the winding 7 and anode 5ᵃ is connected a resistance or impedance device 9, the other terminal thereof being connected to a point between the winding 7ᵃ and the anode 5ᵃ. This impedance device may be made adjustable for determining its most desirable value but may be made of a fixed comparatively high value after determining its amount for obtaining satisfactory operation.

An auxiliary rectifier 10 is shown of the full wave type having the anodes or plates 10ᵃ and 10ᵇ respectively and the cathode or filament 10ᶜ. The anodes are respectively connected to the terminals of the secondary winding 4ᵇ. The filament is supplied with heating current by being connected to the terminals of the secondary winding 4ᶜ. From the mid-point of this winding extends a lead 11ᵃ to form the positive lead for the direct curent derived from the rectifier 10; and from the mid-point of the secondary winding 4ᵇ extends a line 11 to form the negative lead of the output from the rectifier 10. The negative lead 11 is connected to one terminal of a winding 12 on the middle leg of the reactor core 6, the other terminal of this winding being connected to the positive lead 11ᵃ.

Another auxiliary rectifier 13 having anodes 13ᵃ and 13ᵇ and a cathode 13ᶜ is shown supplied with energy derived from the secondary winding 4ᵈ; but interposed between the winding 4ᵈ and the rectifier 13 is an alternating current voltage regulator 14 which may be of any desirable form. The Kouyoumjian Patent Nos. 1,812,-299, granted June 30, 1931 and 1,826,890, granted October 13, 1931 are good examples of a desirable form of regulator for this purpose and serve to maintain a constant voltage output and consequently a constant current through the coil supplied thereby regardless of change of voltage at the source. The terminals of the secondary winding of such a voltage regulator are connected to the anodes 13ᵃ and 13ᵇ respectively, while a mid-tap 15 from the secondary winding is connected to one terminal of another winding 16 on the middle leg of the reactor core 6. The secondary winding 4ᵉ supplies heating current to the filament 13ᶜ of the rectifier 13, a mid-tap 15ᵃ from the secondary 4ᵉ being connected to the other terminal of the winding 16. Instead of deriving the fixed current flowing through the winding 16 from the source as shown, any suitable means for supplying a fixed current to the winding 16 may be used.

This suggested substitution of other means for supplying a fixed voltage and current instead of using an alternating current voltage regulator, also applies to other figures of the drawings where an alternating current voltage regulator is indicated.

The connections and direction of turns of the windings 7 and 7ᵃ on the core 6 are such as to cause the flux created by them to establish themselves in opposite directions in the outside path of the core, as indicated by the arrows on the upper and lower legs, thus causing these fluxes to pass through the middle leg of the core from right to left, as indicated by the dotted arrow on the middle leg of the core. The connection and direction of turns of the winding 16, which tends to create a substantially fixed flux, are such as to cause its flux to pass, as indicated by the full line arrow applied over the winding 16, from right to left and act cumulatively with the flux due to the windings 7, 7ᵃ. The connection and direction of turns of the winding 12 are such as to cause its flux to oppose that of the winding 16, being from left to right, as indicated by the full line arrow applied over the winding 12. The ampere-turns of the windings 12 and 16 are made equal at the normal or standard line voltage of the alternating current generator. If the line voltage decreases slightly, the ampere-turns of the winding 16, remain the same as before while the ampere-turns of the winding 12 decrease with the result that there is a flux due to the predominating ampere-turns of the winding 16 which is in the same sense as that created alternately by the anode currents in windings 7 and 7ᵃ and thus biases the iron of the core to a more positive condition. This will correspondingly reduce the reactance of the windings 7, 7ᵃ with the result that an increased voltage is applied to the rectifier 5. This will increase the output of the rectifier to the exciter winding 2 and counteract the tendency of any appreciable reduction in the line voltage, so that the voltage applied to the mains 47 by the alternator is maintained approximately constant. If the line voltage increases above normal the current through the winding 12 will increase somewhat while that through the winding 16 will remain fixed. The ampere-turns of the winding 12 will then predominate over those of the winding 16 and increase the reactance of the windings 7, 7ᵃ by biasing the iron of the core in a negative sense and thereby reduce the output of the rectifier 5 to the exciting winding 2. This will prevent the output voltage of the alternator from rising any objectionable amount above normal.

As thus far explained, the effect of the shunting impedance 9 has been ignored. The use of this shunting impedance has an advantageous effect in amplifying the regulating effect of the control reactor and permits the reactor to be made of a smaller capacity for securing the desired control than would be the case without the use of this cooperating impedance device 9. This shunting impedance device is disclosed in various relationships to other apparatus and broadly claimed in my pending application, Serial No. 535,600, filed May 7, 1931. It serves to cause an auxiliary current to pass through the windings 7, 7ᵃ during the alternate periods when those windings are inactive in supplying current to the consumption circuit. Considering the winding 7ᵃ, and assuming that this supplies current to the rectifier in a given direction, which we may call positive, then during the alternate non-active periods, the impedance device 9 will cause or permit a current, which may be of comparatively small amount, to pass through the winding 7ª in the reverse direction. This will be understood because during the alternate periods when the winding 7ª is inactive in supplying current to the load, the winding 7 will be active in supplying current to the load and, by reason of the shunting impedance 9, a small part of the current supplied by the winding 7 will pass through this shunt and through the winding 7ª back to the source in a direction, say negative, and opposite to that of the current through winding 7ª when it is supplying current to the load. The conditions thus set up in the winding 7ª and its core, as regards flux and energy conditions, tends to establish in greater or lesser degree, as determined by the value of the impedance 9, the conditions which would exist if the winding 7ª and its core had not been subjected to inactive periods as regards supply of energy to the consumption circuit. Consequently, when the winding 7ª again becomes normally active, the amount of energy and current which this winding is permitted to deliver to the consumption circuit is correspondingly controlled. A similar condition exists with reference to the winding 7 and its core by the controlling effect of the impedance device 9 in causing a controlling current to be passed through the winding 7 in a direction opposite to that of the normal load current therethrough; and this opposite controlling current will pass through the winding 7 during the alternate inactive periods of the winding 7. It has been found in practice that the controlling current, due to the presence of the impedance device, is very slight for obtaining the desired effect in the control of the rectifier voltage.

The cooperative effect of the impedance device 9 with the action of the windings 12 and 16 will now be considered. When the bucking windings 12 and 16 are of equal and opposite effect, the device 9 is made of such value as to give normal line voltage by the alternator. When the line voltage decreases slightly, a decreased controlling current passes through the impedance 9 with the result that it affects the recurring transitory energy conditions to permit an increase of current to pass in the windings 7 and 7ª to the rectifier and thereby cooperate with the controlling effect of the windings 12 and 16 to increase the output of the rectifier to the field winding 2. When the line voltage of the alternator rises above normal, the shunting impedance 9 will cause an increase of current to be passed through the windings 7, 7ª during their otherwise inactive periods and so control the transitory energy conditions as to decrease the output of the rectifier 5 and thus cooperate with the controlling effect of the windings 12 and 16 to maintain the output of the alternator approximately constant. A comparatively small change of current through the impedance shunting circuit has a very considerable effect in change of current output of rectifier 5. By proper proportioning of the windings of the reactor and of the impedance device 9, the controlling effect may be caused to give any desired control of the output voltage of the alternator, as will be understood by those skilled in the art.

Figure 2:
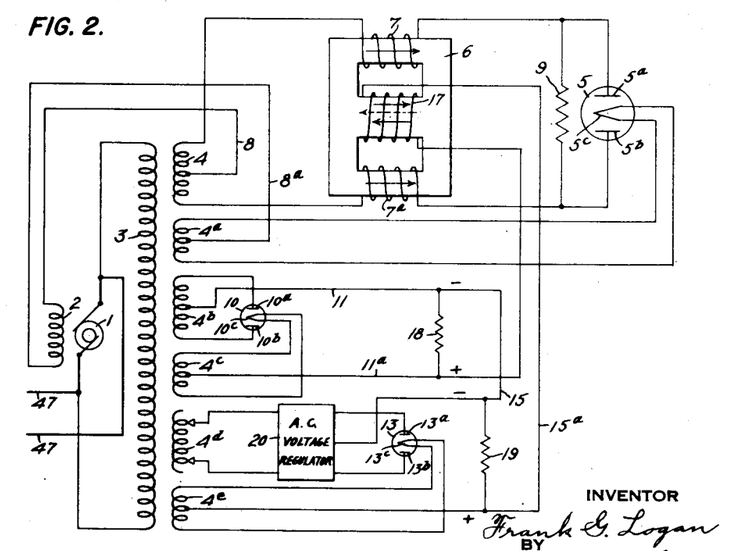
Fig. 2 is a diagram wherein a controlling winding is subject to passage of current in opposite directions and of variable amount.

In Fig. 2 the parts corresponding to those of Fig. 1 are correspondingly numbered. In Fig. 2 instead of using two bucking windings on the central leg of the reactor 6, a single winding 17 is used. The control in this figure is dependent upon change of value of the current in this winding and of the reversal of current therein so as to cause the flux due to this winding to be either in the same sense as the flux due to the windings 7, 7ª, as indicated by the lower arrow on the middle leg of the core, or to be in the opposite sense, as indicated by the upper arrow on the middle leg of the core.

The output lines of the rectifier 10 in Fig. 2 have a resistance 18 connected between them. Also the output lines of the rectifier 13 have a resistance 19 connected between them. The rectifier 13 in Fig. 2 is subject to change of load and as the output voltage thereof should be maintained of fixed value, the alternating current voltage regulator 20 which supplies the same should be of a type which maintains the output voltage constant with change of load, regardless of changes in the input voltage to the regulator. Suitable forms of regulators for this purpose are disclosed in Kouyoumjian Patents Nos. 1,828,054, granted October 20, 1931, 1,828,900 granted October 27, 1931 and 1,830,232, granted November 3, 1931, the disclosure of the latter patent being ordinarily the most advantageous.

The negative output line 15 of the rectifier 13 is connected to the negative line 11 of the rectifier 10. The positive lead 15ª of the rectifier 13 is connected to one terminal of the winding 17, the other terminal thereof being connected to the positive line 11ª of the rectifier 10. It will thus be seen that the output voltages of these two auxiliary rectifiers are placed in opposition to each other with the controlling winding 17 in the series connection between the output lines. When the output voltage of the rectifier 10 equals that of the approximately fixed reference voltage of the rectifier 13, no current will flow through the winding 17, because the voltages are balanced against each other. When the voltage of the variable voltage rectifier 10 slightly exceeds that of the rectifier 13, a comparatively large current will flow through the winding 17 in one direction, the resistance 19 serving as a return path for the current to the rectifier 10. When the output voltage of the rectifier 10 is below that of the rectifier 13, current will flow through the winding 17 in the reverse direction and be supplied by the rectifier 13, the resistance 18 serving as a return path to this rectifier.

In operation, let it be assumed that the voltage of the alternator rises slightly above normal. This will cause the output voltage of the rectifier 10 to exceed that of the fixed reference voltage of the rectifier 13 and cause current to flow in winding 17 in one direction, the connections and direction of turns being such as to then cause the flux due to winding 17 to be in the opposite sense to the flux due to the windings 7, 7ª, as indicated by the upper arrow on the middle leg of the reactor. The negative bias thus imposed upon the core will increase the reactance of the windings 7, 7ª and result in reducing the output of the rectifier 5 to the field winding 2 of the alternator and prevent any material increase in the output voltage thereof. When the voltage of the alternator falls slightly below normal, the rectifier 13 will supply current in the opposite direction through the winding 17, the resistance 18 then serving as a return path, and cause the flux of winding 17 to act in the same sense as the flux due to the windings 7, 7ª, as indicated by the lower arrow on the middle leg of the reactor, thus biasing the iron of the core in a positive sense. This reduces the reactance of the windings 7, 7ª, thereby permitting the rectifier 5 to yield an increased output to the field winding 2 and prevent the voltage of the alternator from falling appreciably below normal value.

The shunting impedance device 9 will cooperate with the reactor to aid in its controlling effect, as already explained with reference to Fig. 1.

The form of regulating apparatus disclosed in Fig. 2 is sometimes preferable to that of Fig. 1, especially where close regulation is desirable, as in Fig. 2 the ampere turns of the winding 17 are directly used in their resulting effect instead of the difference of the ampere turns of the windings 12 and 16 of Fig. 1. Also the single winding 17 is more economical and permits the cost of the reactor to be lower and permits the total cost to be less even though a variable load alternating current voltage regulator 20 is of somewhat higher cost than that of the regulator 14 used in Fig. 1.

Figure 3:
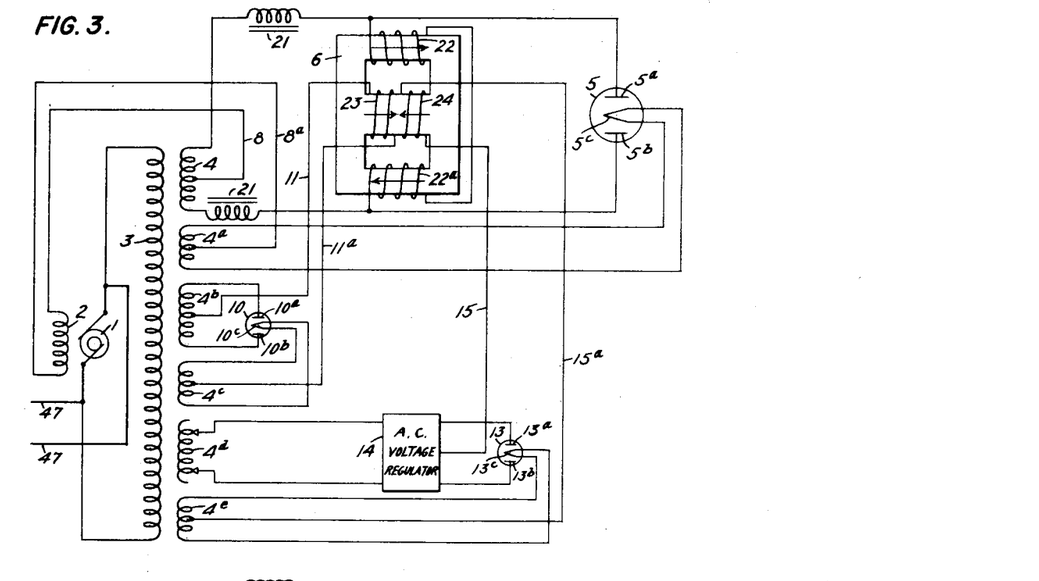
Fig. 3 is a diagram showing a modified form of controlling means.

In Fig. 3 a separate anode reactor 21 is provided in each of the leads to the anodes of the rectifier 5 and the control of the output of the rectifier 5 for regulating the voltage of the main generator is dependent upon control of the recurring transient conditions of the circuits to the rectifier. The above mentioned pending application, Serial No. 535,600 quite fully explains this method of control and also my pending application, Serial No. 671,985, filed May 20, 1933 wherein the voltage of a consumption circuit is automatically regulated. In Fig. 3 the reactors 21 may be of the usual type which have been and are commonly used for increasing the duration of current flow in the anode circuit. On the outside legs of the reactor core 6 are windings 22, 22ª, which serve as the shunting impedance around the rectifier for variably controlling the output thereof. The windings 22, 22ª are connected in series with each other and to points between the reactors 21 and the plates of the rectifier 5. The output of the rectifier 10 supplies a winding 23 on the middle leg of the core 6. The rectifier 13 supplies a winding 24 also on the middle leg of the core 6. The flux, due to the windings 22, 22ª, is in the same direction in the outside path of the core, as indicated by the arrows on the upper and lower legs. The connection and direction of turns of the windings 23 and 24 are such that the magneto-motive force of the winding 23 is opposite to that of the winding 24. The winding 24 being supplied by the rectifier 13 receives a current of approximately constant value owing to the fact that the output of the rectifier 13 is kept constant by the alternating current voltage regulator 14.

The windings 23 and 24 are adjusted to have their magneto-motive forces approximately equal at the lowest voltage to which the alternator 1 is to be permitted to go. Under these conditions the reactance of the windings 22, 22ª is a maximum and the controlling current through these windings is then a minimum and has least effect upon the recurring transient energy conditions of the anode circuits. This results in the output of the rectifier 5 being a maximum at lowest limit of the line voltage. When the line voltage increases somewhat, the output of the rectifier 13 remains constant, as well as the ampere turns of the winding 24; but the output of the rectifier 10 increases in response to the increase in supply voltage and increases the current in the winding 23. The ampere-turns of this winding will then predominate over those of the winding 24, thus producing a net flux which will tend to saturate the core. This reduces the reactance of the windings 22 and 22ª, permitting an increased shunting current to pass through the reactors 21 during their alternate non-active periods and, by control of the recurring transient conditions, reduces the output of the rectifier 5 to the field winding 2 and thereby prevents the line voltage from increasing any objectionable amount. Similarly when the line voltage decreases somewhat, the output of the rectifier 10 decreases and decreases the current in winding 23. This reduces the degree of predominance of the ampere-turns of winding 23 over those of winding 24 and increases the reactance of windings 22 and 22ª, causing a decreased current to pass through the reactors 21 during their alternate non-active periods. The resulting increased output of the rectifier 5 to the field winding 2 prevents the voltage of the generator from decreasing any objectionable amount.

Figure 4:
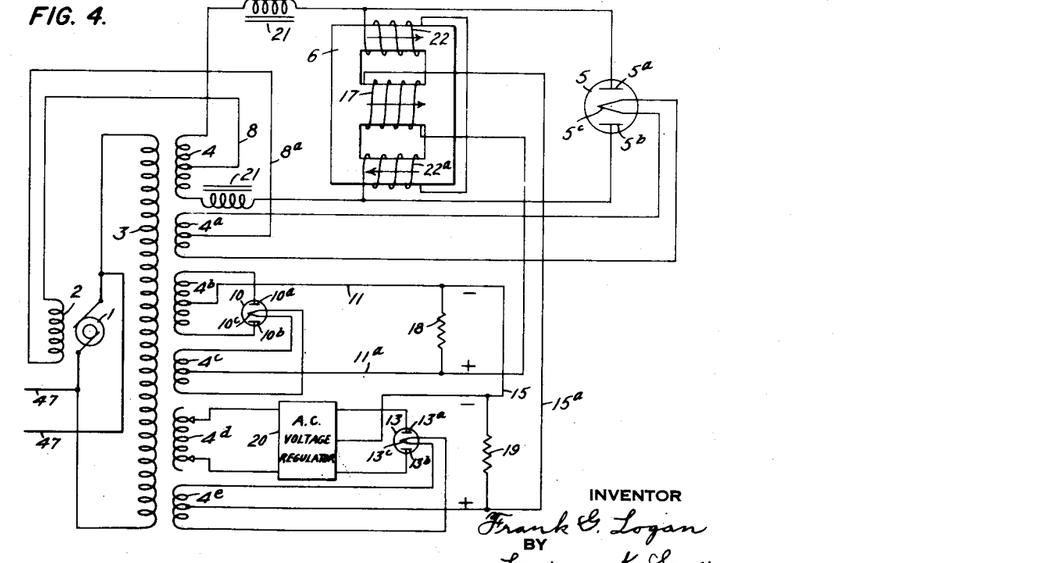
Figs. 4 and 5 are diagrams of still other modifications.

Instead of using the two windings 23 and 24, a single winding could be used upon the middle leg of the reactor 6 and this single winding could be subjected to the opposed voltages of the rectifiers 10 and 13 and controlled in the same way as the winding 17 of Fig. 2, the voltage of the rectifier 13 being then maintained at a fixed value corresponding to the lowest permitted voltage limit of the main generator. Such a system is shown in Fig. 4. The current in winding 17 instead of being reversible in this case will be in one direction only and will increase from zero to a maximum as the generator voltage tends to rise from its lowest limit to the maximum.

Figure 5:
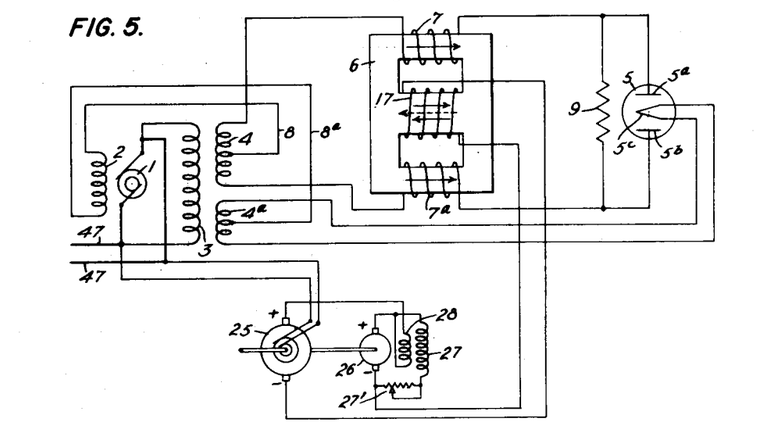

In Fig. 5 the method of control is similar to that already described with reference to Fig. 2. In Fig. 5, however, the fixed reference voltage and the control voltage are obtained in a different way. For obtaining the control voltage a rotary converter 25 is supplied with alternating current derived from the main generator 1 and is operated at synchronism. As the main generator is operated at constant speed in practice, the frequency of its current will be constant and thus cause the synchronously operated rotary converter to be driven at constant speed. The output voltage of a rotary converter always maintains a definite ratio to that of the input voltage. Thus the direct current output voltage of the converter 25 will reflect any change in voltage, or tendency to change, of the main generator. This consequently gives out the control voltage factor. On the converter shaft, or driven thereby at a constant speed, is a direct current generator 26. This auxiliary generator provides the substantially constant, or fixed reference voltage. It is shown as having a shunt field winding 27 in series with an adjustable field rheostat 27¹, the latter permitting adjustment to any desired value of reference voltage for determining the voltage at which the main generator will be maintained. The generator 26 will preferably be compound wound, a series field winding 28 being shown for the purpose of maintaining a constant output voltage under its variable load. That is, it will preferably be flat-compounded, but may be overcompounded or under-compounded where desired.

The positive terminal of the converter is connected to the positive terminal of the generator 26, while the negative terminal of the converter is connected to the negative terminal of the generator 26 with the winding 17 connected in series in this circuit of opposed voltages. The direction of turns of the windings on the reactor core 6 and their connections are such as to give the relative direction of flux as described with reference to Fig. 2. The method of control of the main generator voltage is also the same. Thus if the voltage of the main generator rises slightly, the output voltage of the converter 25 will exceed that of the generator 26 and cause current to flow in winding 17 in a direction to cause its flux to be in a sense opposite to that due to the windings 7, 7a as indicated by the upper arrow on the middle leg of the reactor and thus bias the iron of the core negatively. This will prevent the voltage of the main generator rising materially, as already explained. When the voltage of the main generator falls slightly below normal, current will pass through the winding 17 in the opposite direction and cause its flux to be in the same sense as the flux due to windings 7, 7a as indicated by the lower arrow on the middle leg of the core, thus biasing the iron positively. The voltage of the main generator is thereby prevented from falling materially.

Figure 6:
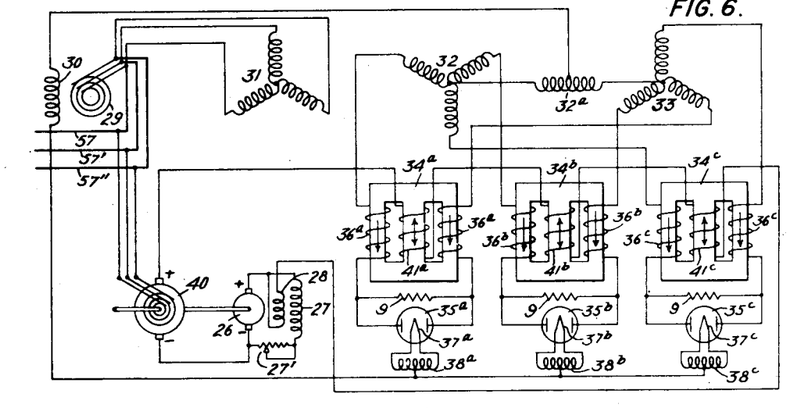
Fig. 6 is a diagram showing one embodiment of my invention applied to the control of a polyphase generator.

Fig. 6 shows one embodiment of my invention as applied to the regulation of a polyphase generator. The main generator 29 is shown as three-phase and as having the field winding 30 and supplying the mains 57, 57', 57''. The windings of a double Y connected transformer are indicated in the upper part of the figure, the Y connected primary being shown at 31, while the double Y connected secondary windings are indicated at 32 and 33. An interphase reactor 32a is shown connected between the neutral point of the two sections of the secondary windings. Three controlling reactors, 34a, 34b, 34c are provided, one for each of the three phases. Each reactor passes energy to its respective rectifier 35a, 35b, 35c. The windings 36a, 36b, 36c on the outer legs of each reactor are respectively connected to the secondary windings 32 and 33 in proper phase relationship, as indicated. They supply current to anodes of their respective rectifiers. The direction of turns and connections of these reactor windings are such as to create fluxes of opposing sense, as regards the outside path of the core and as indicated by the arrows on the outer legs of each core. The cathodes 37a, 37b, 37c of the rectifiers are respectively connected in proper phase relationship to auxiliary secondary windings 38a, 38b, 38c energized from the primary windings 31. The field winding 30 of the main generator is supplied with current derived from the rectifiers by being connected between the mid-point of the interphase reactor 32a and the mid-tap of the secondaries 38a, 38b, 38c supplying the filaments or cathodes of the rectifiers.

The controlling voltage reflecting the condition of the main alternator voltage is derived from the alternator by a synchronous three-phase rotary converter 40. It has its alternating end supplied from the three-phase supply mains and maintains a direct current voltage at its commutator end which reflects any change in voltage of the alternator, as already explained in connection with Fig. 5. Another advantageous feature in using a rotary converter with a polyphase system for this purpose is that it correctly reflects the average voltage of the three phases of the main generator, avoiding the use of separate devices in the different phases for obtaining this result. The rotary 40 drives at constant speed the direct current generator 26 as above described in connection with Fig. 5, giving the fixed reference voltage. Each controlling reactor has a winding 41a, 41b, 41c on its middle leg which receives the variable and reversible controlling current from the rotary 40 and auxiliary generator 26. These windings are connected in series with each other and are connected in series in the circuit of the opposed voltages of the direct current end of the converter 40 and generator 26 as shown. The mode of operation is the same as that already described in connection with Fig. 5 and secures close control of the voltages of the three-phases of the main generator.

Figure 7:
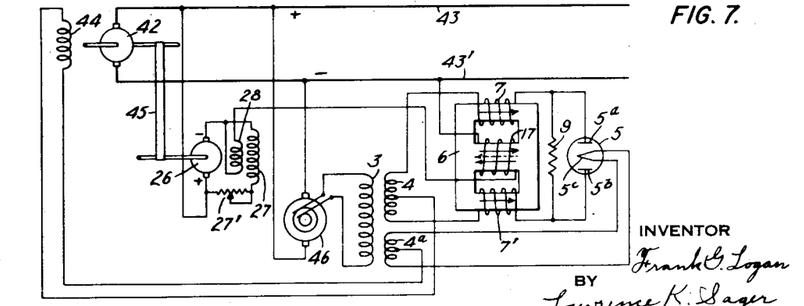
Fig. 7 is a diagram showing one form of my invention applied to the control of a direct current generator. Where the same reference characters are used in the different figures, they represent corresponding parts.

Fig. 7 shows an embodiment of my invention applied to the regulation of a main generator of the direct current type. The armature 42 of the main generator supplies the mains 43, 43¹. Its voltage is regulated by change of current in its field winding 44. Here the control voltage, reflecting the condition of the main generator voltage, may be taken as the main generator voltage itself, or a fixed fraction thereof, it being direct current. The fixed reference voltage is supplied by the generator 26 driven at a constant speed. Any suitable means may be used for so driving this auxiliary generator such as a suitably controlled constant speed motor supplied from the main generator or from any other source, or a synchronous motor might be used where alternating current of constant frequency is available. But in Fig. 7 for general purposes of explanation, the generator 26 is shown driven at constant speed by the belt 45 from the shaft of the main constant speed generator.

A rotary converter 46 is driven by energy derived from the main generator, its direct current end being shown connected to the mains 43, 43¹. The rotary is here used for the purpose of providing alternating current energy for use in the controlling reactor and for supplying the rectifier. Thus the alternating current end of the rectifier supplies a primary 3 of a transformer having secondary windings 4, 4a. The reactor core 7 and its windings and the rectifier 5 correspond to those of Fig. 2, as well as their connections, the rectifier supplying the field winding 44 of the main generator. The winding 17 of the reactor is connected in series in the circuit containing the opposed voltages of the main generator and the auxiliary constant voltage generator 26. The operation will be readily understood from the explanations already made.

Although I have described various embodiments of this invention, it will be understood that various modifications and other embodiments may be made without departing from the scope of the invention. Thus the fixed reference voltage, or other constant factor, may be obtained or derived in any way. The control voltage, or other controlling factor, may likewise be derived in any way provided it properly reflects the condition of the main voltage. The invention is applicable to various forms and types of generators and generating apparatus. Where an auxiliary exciter is used for supplying the field of the main generator, the field of the exciter may obviously be controlled by this invention and thus indirectly control the field of the main generator. However, by use of the present invention the controlled energy for securing the regulation may be made so large and be variable over such a wide range that the auxiliary exciter is ordinarily not needed and the cost thereof avoided.

The form or type of the controlling reactor and the arrangement of the windings thereon may be varied to suit particular conditions or preference of the designer. Also, any form or type of rectifier may be used; and, instead of using full wave rectifiers, half-wave rectifiers may be used. Many other variations may be used in the type, form and relationship of the apparatus used.

I claim:

1. The combination of a generator, a rectifier for supplying current to affect the field strength of said generator, means for maintaining a constant reference voltage, means for opposing said voltage by a voltage corresponding to the voltage of said generator, and electromagnetic means responsive to said opposed voltages for controlling the output of said rectifier.

2. The combination of a generator, a rectifier for supplying current to affect the field strength of said generator, means for maintaining a constant reference voltage, means for opposing said voltage by a voltage corresponding to the voltage of said generator, and a reactor responsive to said opposed voltages and related to the supply circuit of said rectifier for controlling the output of said rectifier.

3. The combination of a generator, a rectifier for supplying current to affect the field strength of said generator, means for maintaining a constant reference factor, means for opposing said factor by a factor corresponding to the voltage of said generator, a reactor responsive to said opposed factors and related to the supply circuit of said rectifier for controlling the output of said rectifier, and an impedance device connected in a shunt circuit around said rectifier for passing a current through a winding of said reactor during the alternate inactive periods of said winding in supplying current to said rectifier.

4. The combination of a generator, a rectifier for supplying current to affect the field strength of said generator, a reactor having a winding in the supply circuit of said rectifier, a source of current whose voltage corresponds with the voltage of said generator, a source of a constant reference voltage, and electromagnetic means connected in a circuit subjected to said voltages in opposition for affecting said reactor to control the output of said rectifier.

5. The combination of a generator, a rectifier for supplying current to affect the field strength of said generator, said rectifier being supplied with energy derived from said generator, a reactor having a winding in the supply circuit of said rectifier, a constant voltage source, and means responsive to change of voltage of said generator with reference to the voltage of said source for affecting said reactor for controlling the output of said rectifier.

6. The combination of a generator, a rectifier for supplying current to affect the field strength of said generator, a reactor having a winding in the supply circuit of said rectifier, a source of current whose voltage corresponds with the voltage of said generator, a source of a constant reference voltage, said reactor having a winding supplied with current from said first named source and having a winding supplied with current from said reference voltage source, the magneto-motive forces of said last two named windings being opposed to each other and affecting the reactance of said first named reactor winding.

7. The combination of a generator, a rectifier for supplying current to affect the field strength of said generator, a reactor having a winding in the supply circuit of said rectifier, a source of current whose voltage corresponds with the voltage of said generator, a voltage source of a constant reference voltage, said reactor having a winding in a circuit subjected to the opposed voltages of said two sources for affecting the reactance of said first named reactor winding.

8. The combination of an alternating current generator, an alternating current voltage regulator for deriving a constant reference voltage therefrom, a rectifier for changing said voltage to a direct current voltage, a second rectifier for deriving a voltage from said generator corresponding to the voltage of said generator, a third rectifier supplied with energy derived from said generator, a reactor having a winding in the supply circuit of said third rectifier, said reactor also having a winding in a circuit subjected to the opposed voltages of said first and second rectifiers, and means for affecting the field strength of said generator controlled by the output of said third rectifier.

9. The combination of a generator, a rectifier for supplying current to affect the field strength of said generator, a reactor having a winding in series in the circuit of said rectifier, a second reactor having a winding connected in a shunt circuit around said rectifier for passing current through the winding of said first named reactor during its alternate inactive periods of conducting the main rectifier current, a second winding on said second reactor, and means for causing said last named winding to be responsive to change of voltage of said source for affecting the reactance of the other winding on said second reactor.

10. The combination of an alternating current generator, a synchronous rotary converter supplied with current derived from said generator, a direct current generator mechanically driven by said converter, a rectifier for supplying current to affect the field strength of said generator, a reactor having a winding in series in the circuit of said rectifier, and said reactor also having a winding connected in a circuit subjected to the opposed voltages of said direct current generator and the direct current voltage of said converter.

11. The combination of a polyphase alternating current generator, a polyphase synchronous rotary converter supplied with current derived from the different phases of said generator, a direct current generator mechanically driven by said converter, rectifying means receiving energy derived from the different phases of said alternating current generator for supplying current to affect the field strength of said generator, reactive means having a winding corresponding to each phase respectively connected in series in the anode circuits of said rectifying means, and said reactive means having a winding connected in a circuit subjected to the opposed voltages of said direct current generator and the direct current voltage of said converter.

12. The combination of a direct current generator, a rectifier for supplying current to affect the field strength of said generator, a source of a constant direct current reference voltage, and a reactor having a winding in series in the circuit of said rectifier, said reactor also having a winding connected in a circuit subjected to the opposed voltages of said generator and of said source.

13. The combination of an alternating current generator, a rectifier for supplying current to affect the field strength of said generator, said rectifier being supplied with energy derived from said generator, a reactor having a winding in the supply circuit of said rectifier, an impedance device connected in a shunt circuit around said rectifier for passing current through the winding of said reactor during its alternative inactive periods of supply of current to said rectifier, and means dependent upon change of voltage of said generator for controlling the amount of current permitted to pass through said impedance device.

14. The combination of an alternating current source, a rectifier for supplying current to affect the field strength of said source, said rectifier being supplied with energy derived from said source, a reactor having a winding in the supply circuit of said rectifier, a second rectifier supplied with energy derived from said source and whose output voltage changes with change of voltage of said source, a constant voltage regulator supplied with energy from said source, a third rectifier supplied with current from said regulator, and means dependent upon change of the output voltage of said second rectifier with reference to that of said third rectifier for affecting said reactor to control the output of said first named rectifier.

15. The method of regulating the voltage of a generator which comprises maintaining a constant reference voltage, opposing the effect of said voltage by that of a voltage corresponding to the generator voltage, utilizing the resultant effect for controlling the voltage of energy delivered from an alternating current source, rectifying said controlled energy derived from said source, and affecting the generator voltage by said rectified current.

16. The combination of a generator, means for maintaining a constant reference voltage, means responsive to the effect of said voltage and that of a voltage corresponding to the voltage of the generator, a source of alternating current energy, means controlled by said first named means for controlling the voltage of energy derived from said source, rectifying means for rectifying the controlled alternating current energy, and means for causing the output of said rectifier to affect the voltage of the generator.

17. The combination of a generator, a rectifier for supplying current to affect the field strength of said generator, means for maintaining a constant reference voltage, means for opposing the effect of said voltage by that of a voltage corresponding to the voltage of said generator, and electro-magnetic means responsive to said opposed effects for controlling the output of said rectifier.

18. The combination of a generator, a rectifier for supplying current to affect the field strength of said generator, means for maintaining a constant reference voltage, means for opposing the effect of said voltage by that of a voltage corresponding to the voltage of said generator, and a reactor responsive to said opposed effects for controlling the output of said rectifier.

19. The combination of a generator, a rectifier for supplying current to affect the field strength of said generator, said rectifier being supplied with energy derived from said generator, a reactor having a winding in the supply circuit of said rectifier, and means for acting with and for opposing the magneto-motive force of said winding according to change of voltage of said generator for controlling the output of said rectifier.

20. The combination of a generator, a rectifier for supplying current to affect the field strength of said generator, said rectifier being supplied with energy derived from said generator, a reactor having a winding in the supply circuit of said rectifier, and means for acting with the magneto-motive force of said winding upon decrease of the voltage of said generator below a certain value and for opposing said magneto-motive force upon increase of said voltage above a certain value for controlling the output of said rectifier.

21. The combination of a generator, a rectifier for supplying current to affect the field strength of said generator, said rectifier being supplied with energy derived from said generator, a reactor having a winding in the supply circuit of said rectifier, a second reactor having a winding connected in shunt around said rectifier for passing a current through the winding on said first named reactor during the alternate inactive periods thereof in supplying current to said rectifier, and means responsive to change of voltage of said generator for increasingly opposing the magneto-motive force of the winding of said second named reactor upon increase of voltage of said generator for controlling the output of said rectifier.

22. The combination of a generator, a rectifier for supplying current to affect the field strength of said generator, a reactor having a winding in the supply circuit of said rectifier, a source of current whose voltage corresponds with the voltage of said generator, a source of a constant reference voltage, electro-magnetic means connected in a circuit subjected to said voltages in opposition for affecting said reactor to control the output of said rectifier, and an impedance device connected in a shunt circuit around said rectifier for passing a current through said winding during the alternate inactive periods of said winding in supplying current to said rectifier.

23. The combination of a generator, a rectifier for supplying current to affect the field strength of said generator, said rectifier being supplied with energy derived from said generator, a reactor having a winding in the supply circuit of said rectifier, a constant voltage source, means responsive to change of voltage of said generator with reference to the voltage of said source for affecting said reactor for controlling the output of said rectifier, and an impedance device connected in a shunt circuit around said rectifier for passing a current through said winding during the alternate inactive periods of said winding in supplying current to said rectifier.

24. The combination of a generator, a rectifier for supplying current to affect the field strength of said generator, a reactor having a winding in the supply circuit of said rectifier, a source of current whose voltage corresponds with the voltage of said generator, a source of a constant reference voltage, said reactor having a winding supplied with current from said first named source and having a winding supplied with current from said reference voltage source, the magneto-motive force of said last two named windings being opposed to each other and affecting the reactance of said first named reactor winding, and an impedance device connected in a shunt circuit around said rectifier for passing a current through said first named winding during the alternative inactive periods of said winding in supplying current to said rectifier.

25. The combination of a generator, a rectifier for supplying current to affect the field strength of said generator, a reactor having a winding in the supply circuit of said rectifier, a source of current whose voltage corresponds with the voltage of said generator, a source of a constant reference voltage, said reactor having a winding in a circuit subjected to the opposed voltages of said two sources for affecting the reactance of said first named reactor winding, and an impedance device connected in a shunt circuit around said rectifier for passing a current through said first named winding during the alternate inactive periods of said winding in supplying current to said rectifier.

26. The combination of an alternating current generator, an alternating current voltage regulator for deriving a constant reference voltage therefrom, a rectifier for changing said voltage to a direct current voltage, a second rectifier for deriving a voltage from said generator, corresponding to the voltage of said generator, a third rectifier supplied with energy derived from said generator, a reactor having a winding in the supply circuit of said third rectifier, said reactor also having a winding in a circuit subjected to the opposed voltages of said first and second rectifiers, means for affecting the field strength of said generator controlled by the output of said third rectifier, and an impedance device connected in a shunt circuit around said third rectifier for passing a current through said first named winding during the alternate inactive periods of said winding in supplying current to said rectifier.

27. The combination of an alternating current generator, a synchronous rotary converter supplied with current derived from said generator, a direct current generator mechanically driven by said converter, a rectifier for supplying current to affect the field strength of said generator, a reactor having a winding in series in the circuit of said rectifier, said reactor also having a winding connected in a circuit subjected to the opposed voltages of said direct current generator and the direct current voltage of said converter, and an impedance device connected in a shunt circuit around said rectifier for passing a current through said first named winding during the alternate inactive periods of said winding in supplying current to said rectifier.

28. The combination of a generator, a rectifier for supplying current to affect the field strength of said generator, said rectifier being supplied with energy derived from said generator, a reactor having a winding in the supply circuit of said rectifier, means for acting with and for opposing the magneto-motive force of said winding according to change of voltage of said generator for controlling the output of said rectifier, and an impedance device connected in a shunt circuit around said rectifier for passing a current through said winding during the alternate inactive periods of said winding in supplying current to said rectifier.

29. The combination of a generator, a rectifier for supplying current to affect the field strength of said generator, said rectifier being supplied with energy derived from said generator, a reactor having a winding in the supply circuit of said rectifier, means for acting with the magneto-motive force of said winding upon decrease of the voltage of said generator below a certain value and for opposing said magneto-motive force upon increase of said voltage above a certain value for controlling the output of said rectifier and an impedance device connected in a shunt circuit around said rectifier for passing a current through said winding during the alternate inactive periods of said winding in supplying current to said rectifier.

FRANK G. LOGAN.